United States Patent
Nakashima et al.

(10) Patent No.: US 12,136,724 B2
(45) Date of Patent: Nov. 5, 2024

(54) CATALYST, ELECTRODE, MEMBRANE ELECTRODE ASSEMBLY, AND AIR BATTERY

(71) Applicants: ZEON CORPORATION, Tokyo (JP); KYUSHU UNIVERSITY, NATIONAL UNIVERSITY CORPORATION, Fukuoka (JP)

(72) Inventors: Naotoshi Nakashima, Fukuoka (JP); Ganesan Pandian, Fukuoka (JP); Hiroaki Shu, Tokyo (JP); Mitsugu Uejima, Tokyo (JP)

(73) Assignees: ZEON CORPORATION, Tokyo (JP); KYUSHU UNIVERSITY, NATIONAL UNIVERSITY CORPORATION, Fukuoka (JP)

( * ) Notice: Subject to any disclaimer, the term of this patent is extended or adjusted under 35 U.S.C. 154(b) by 521 days.

(21) Appl. No.: 17/594,188

(22) PCT Filed: Apr. 15, 2020

(86) PCT No.: PCT/JP2020/016588
§ 371 (c)(1),
(2) Date: Oct. 6, 2021

(87) PCT Pub. No.: WO2020/213648
PCT Pub. Date: Oct. 22, 2020

(65) Prior Publication Data
US 2022/0173457 A1    Jun. 2, 2022

(30) Foreign Application Priority Data
Apr. 15, 2019  (JP) ................. 2019-077298

(51) Int. Cl.
*H01M 4/90*  (2006.01)
*H01M 4/96*  (2006.01)
(Continued)

(52) U.S. Cl.
CPC ......... *H01M 12/08* (2013.01); *H01M 4/9008* (2013.01); *H01M 4/96* (2013.01); *H01M 8/1004* (2013.01)

(58) Field of Classification Search
CPC ...... H01M 12/08; H01M 4/9008; H01M 4/96; H01M 8/1004
See application file for complete search history.

(56) References Cited

U.S. PATENT DOCUMENTS

2011/0245071 A1* 10/2011 Tanabe ................. B01J 23/745
                                                        502/180
2022/0181665 A1   6/2022 Nakashima et al.

FOREIGN PATENT DOCUMENTS

| CN | 1830108 A | 9/2006 | |
| CN | 107431213 A | * 12/2017 | .......... H01M 4/0407 |
| CN | 113613784 A | 11/2021 | |

OTHER PUBLICATIONS

Nalwa et al., "Electrical Properties of Thiourea-Formaldehyde Condensates", European Polymer Journal, vol. 17, pp. 145-149 (Year: 1981).*

(Continued)

*Primary Examiner* — Christian Roldan
*Assistant Examiner* — Robert Gene West
(74) *Attorney, Agent, or Firm* — KENJA IP LAW PC

(57) ABSTRACT

Provided is a low-cost catalyst that has excellent oxygen reduction reaction (ORR) catalytic activity and is useful as a catalyst for water electrolysis, an electrode catalyst for an air battery, or the like. The catalyst includes (A) Ni atoms, (B) a condensate of thiourea and formaldehyde, and (C) porous carbon.

5 Claims, 1 Drawing Sheet

(51) Int. Cl.
      *H01M 8/1004*     (2016.01)
      *H01M 12/08*      (2006.01)

(56) References Cited

OTHER PUBLICATIONS

Sep. 28, 2021, International Preliminary Report on Patentability issued in the International Patent Application No. PCT/JP2020/016588.

Jun Yang et al., Decorating unoxidized-carbon nanotubes with homogeneous Ni—Co spinel nanocrystals show superior performance for oxygen evolution/reduction reactions, Scientific Reports, 2017, vol. 7, Article No. 45384.

Ming Zhang et al., Ultrasonic synthesis of thiourea-melamine-formaldehyde chelate resins for preparation of Ag@MFT and Ni@MFT, Oct. 12, 2013.

Panadian Ganesan et al., Designing a nickel(II) thiourea-formaldehyde polymer/nanocarbon bifunctional molecular catalyst with superior ORR, OER activities and its application to Zn-air battery, Materials Advances, Jul. 2, 2022, pp. 6539-6548.

* cited by examiner

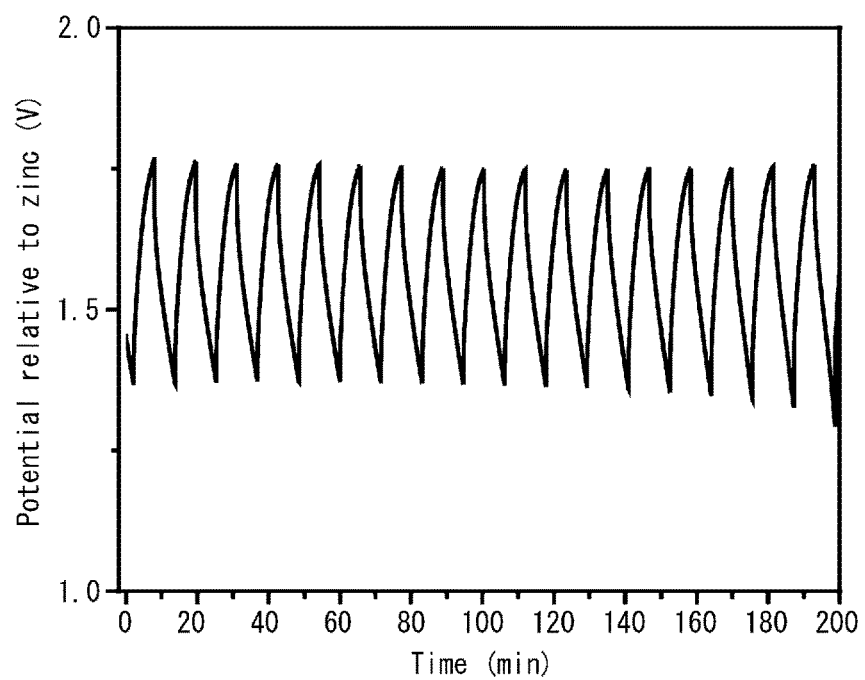

CATALYST, ELECTRODE, MEMBRANE ELECTRODE ASSEMBLY, AND AIR BATTERY

TECHNICAL FIELD

The present disclosure relates to a catalyst, an electrode, a membrane electrode assembly, and an air battery, and, in particular, relates to a low-cost catalyst that has excellent oxygen reduction reaction (ORR) catalytic activity and that is useful as a catalyst for water electrolysis, an electrode catalyst for an air battery, or the like, an electrode that contains the aforementioned catalyst, a membrane electrode assembly that includes the aforementioned electrode, and a chargeable/dischargeable air battery that includes the aforementioned electrode or the aforementioned membrane electrode assembly.

BACKGROUND

The development of electrochemical energy storage systems such as fuel cells, redox fuels, supercapacitors, and rechargeable batteries has been attracting attention due to demand for mobile electronic devices, electric vehicles, and efficient use of renewable energy.

In particular, there has been focus on the development of efficient electrode catalysts having oxygen reduction reaction (ORR) functionality.

Although conventionally used precious metal-based catalysts such as platinum (Pt) and iridium(IV) oxide ($IrO_2$) nanoparticles are efficient electrode catalysts, they have a drawback of high cost. Consequently, the development of non-metal catalysts formed of elements that are abundantly present on Earth has become highly desirable in recent years. Although progress has been made in the development of efficient catalysts using transition metal oxides, transition metal sulfides, doped nanocarbons, and so forth, there is an issue that these catalysts do not necessarily have high performance.

In order to resolve this issue, oxygen reduction reaction (ORR) catalytic activity has been improved by, for example, loading homogeneous $Ni_xCo_{3-x}O_4$ spinel oxide nanoparticles onto multi-walled carbon nanotubes (MWCNTs) that have been surface coated with pyridine-containing polybenzimidazole (PyPBI) (for example, refer to Non-Patent Literature (NPL) 1).

CITATION LIST

Patent Literature

NPL 1: J. Yang, T. Fujigaya, N. Nakashima, "Decorating unoxidized-carbon nanotubes with homogeneous Ni—Co spinel nanocrystals show superior performance for oxygen evolution/reduction reactions", Sci. Rep., 2017, 7, art. no. 45384

SUMMARY

Technical Problem

However, even the catalyst described in NPL 1 leaves room for improvement in terms of achieving a combination of both oxygen reduction reaction (ORR) catalytic activity and low cost.

Accordingly, the present disclosure is directed at a problem of providing a low-cost catalyst that has excellent oxygen reduction reaction (ORR) catalytic activity and that is useful as a catalyst for water electrolysis, an electrode catalyst for an air battery, or the like, an electrode that contains the aforementioned catalyst, a membrane electrode assembly that includes the aforementioned electrode, and a chargeable/dischargeable air battery that includes the aforementioned electrode or the aforementioned membrane electrode assembly.

Solution to Problem

The inventors made extensive studies to achieve the foregoing object. The inventors discovered that a combination of both oxygen reduction reaction (ORR) catalytic activity and low cost can be achieved with a catalyst that includes (A) Ni atoms, (B) a condensate of thiourea and formaldehyde, and (C) porous carbon, and, in this manner, completed the present disclosure.

Specifically, the present disclosure aims to advantageously solve the problem set forth above, and a presently disclosed catalyst comprises: (A) Ni atoms; (B) a condensate of thiourea and formaldehyde; and (C) porous carbon. As a result of the presently disclosed catalyst including (A) Ni atoms, (B) a condensate of thiourea and formaldehyde, and (C) porous carbon in this manner, the presently disclosed catalyst has excellent oxygen reduction reaction (ORR) catalytic activity and low cost, and is useful as a catalyst for water electrolysis, an electrode catalyst for an air battery, or the like.

Moreover, the present disclosure aims to advantageously solve the problem set forth above, and a presently disclosed electrode comprises the catalyst set forth above. The presently disclosed electrode has excellent oxygen reduction reaction (ORR) catalytic activity as an electrode as a result of containing the catalyst set forth above.

Furthermore, the present disclosure aims to advantageously solve the problem set forth above, and a presently disclosed membrane electrode assembly comprises the electrode set forth above.

Also, the present disclosure aims to advantageously solve the problem set forth above, and a presently disclosed air battery comprises the electrode set forth above or the membrane electrode assembly set forth above. The presently disclosed air battery is chargeable and dischargeable and has excellent electricity generation efficiency as a result of including the electrode set forth above or the membrane electrode assembly set forth above.

Note that the term "air battery" as used in the present disclosure refers to a battery in which oxygen in air is used as a positive electrode active material and in which a metal (zinc or lithium) is used as a negative electrode active material (i.e., a zinc-air battery or a lithium-air battery).

Advantageous Effect

According to the present disclosure, it is possible to provide a low-cost catalyst that has excellent oxygen reduction reaction (ORR) catalytic activity and is useful as a catalyst for water electrolysis, an electrode catalyst for an air battery, or the like. Moreover, according to the present disclosure, it is possible to provide an electrode that contains the aforementioned catalyst, a membrane electrode assembly that includes the aforementioned electrode, and a chargeable/dischargeable air battery that includes the aforementioned electrode or the aforementioned membrane electrode assembly.

BRIEF DESCRIPTION OF THE DRAWINGS

In the accompanying drawings,

FIG. 1 is a graph illustrating a charge/discharge characteristic for a zinc-air battery that was produced with a catalyst B produced in Example 2 as a positive electrode catalyst.

DETAILED DESCRIPTION

The following provides a detailed description of the present disclosure, divided into sections for 1) a catalyst, 2) an electrode, 3) a membrane electrode assembly, and 4) an air battery. However, the present disclosure is not limited to the following embodiments.

(Catalyst)

The presently disclosed catalyst includes (A) Ni atoms, (B) a condensate of thiourea and formaldehyde, and (C) porous carbon, and may further include other components as necessary.

The presently disclosed catalyst has excellent oxygen reduction reaction (ORR) catalytic activity and low cost, and is useful as a catalyst for water electrolysis, an electrode catalyst for an air battery, or the like.

In the presently disclosed catalyst, the condensate of thiourea and formaldehyde may be coordinated with the Ni atoms. Coordination of the condensate of thiourea and formaldehyde with the Ni atoms enables functionality as a catalytically active component having excellent oxygen reduction reaction (ORR) catalytic activity.

<(A) Ni Atoms>

The (A) Ni atoms in the presently disclosed catalyst may be present individually as atoms or may be present as an oxide. Alternatively, the Ni atoms may be coordinated with the (B) condensate of thiourea and formaldehyde to form a coordination compound (Ni-TUF). These each function as a catalytically active component.

<<Content of Ni Atoms>>

The content of Ni atoms in the presently disclosed catalyst is preferably 1 mass % or more, more preferably 3 mass % or more, and particularly preferably 5 mass % or more, and is preferably 25 mass % or less, more preferably 20 mass % or less, and particularly preferably 15 mass % or less.

Catalytic activity can be improved through the content of Ni atoms being not less than any of the lower limits set forth above, whereas high catalytic activity can be expressed through the content of Ni atoms being not more than any of the upper limits set forth above.

Note that the content of Ni atoms in the presently disclosed catalyst can be measured using energy dispersive X-ray spectroscopy (EDX), an element mapping image, or the like, for example. Moreover, in a case in which the Ni atoms are used in the form of a coordination compound (Ni-TUF) in production of the catalyst, the content thereof can be calculated based on the amount of the coordination compound (Ni-TUF) that is used.

<(B) Condensate of Thiourea and Formaldehyde (TUF)>

The (B) condensate of thiourea and formaldehyde (TUF) in the presently disclosed catalyst may be present individually as the condensate or may form a coordination compound (Ni-TUF) in which it is coordinated with the (A) Ni atoms.

Note that the (B) condensate of thiourea and formaldehyde includes a structure represented by general formula (1), shown below, in at least part thereof and normally has a three-dimensional cross-linked structure.

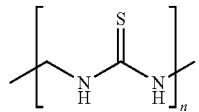

General Formula (1)

In general formula (1), n represents an integer of 10 or more. Note that the upper limit for n is normally approximately 1,000.

<<Weight-Average Molecular Weight of Condensate (TUF)>>

The weight-average molecular weight of the condensate (TUF) is preferably 1,000 or more, more preferably 2,000 or more, and particularly preferably 8,000 or more. High catalytic activity can be expressed when the weight-average molecular weight is not less than any of the lower limits set forth above.

<<Number-Average Molecular Weight of Condensate (TUF)>>

The number-average molecular weight of the condensate (TUF) is preferably 800 or more, more preferably 1,500 or more, and particularly preferably 5,000 or more. High catalytic activity can be expressed when the number-average molecular weight is not less than any of the lower limits set forth above.

<<Molecular Weight Distribution of Condensate (TUF)>>

The molecular weight distribution of the condensate (TUF) (value obtained by dividing the weight-average molecular weight by the number-average molecular weight of the copolymer) is preferably 5 or less, more preferably 3 or less, and particularly preferably 2 or less. High catalytic activity can be expressed when the molecular weight distribution is not more than any of the upper limits set forth above.

Note that the weight-average molecular weight and the number-average molecular weight of the (B) condensate can be calculated through measurement by gel permeation chromatography. For example, the weight-average molecular weight (Mw) and the number-average molecular weight (Mn) of the (B) condensate can be determined as standard polystyrene-equivalent values using a gel permeation chromatograph (HLC-8220 produced by Tosoh Corporation) and using tetrahydrofuran as an eluent solvent, and then the molecular weight distribution (Mw/Mn) can be calculated.

<<Content of Condensate (TUF)>>

The content of the condensate (TUF) in the presently disclosed catalyst is preferably 3 mass % or more, more preferably 5 mass % or more, and particularly preferably 10 mass % or more, and is preferably 60 mass % or less, more preferably 40 mass % or less, and particularly preferably 15 mass % or less.

Sufficient coordination of the condensate with Ni atoms is possible when the content thereof is not less than any of the lower limits set forth above, whereas high catalytic activity can be expressed when the content is not more than any of the upper limits set forth above.

Note that the content of the condensate in the presently disclosed catalyst can be measured using energy dispersive X-ray spectroscopy (EDX), an element mapping image, or the like, for example. Moreover, in a case in which the condensate is used in the form of a coordination compound (Ni-TUF) in production of the catalyst, the content thereof can be calculated based on the amount of the coordination compound (Ni-TUF) that is used.

<<Production Method of Condensate (TUF)>>

The method by which the condensate (TUF) is produced may, for example, be a method in which thiourea is added into formaldehyde aqueous solution, pH adjustment is performed with acetic acid, and then refluxing is performed at a specific temperature for a specific time to yield a white viscous product that is then vacuum dried at a specific temperature.

<Coordination Compound (Ni-TUF)>

In the coordination compound (Ni-TUF) in which the condensate is coordinated with a Ni atom, S atom parts of the condensate coordinate with the Ni atom to form a coordination compound as illustrated in general formula (2), shown below. Note that at least some of the Ni atoms have S atoms coordinated therewith but it is not essential that all of the Ni atoms have S atoms coordinated therewith.

It is possible to confirm that a coordination compound has been formed through $^1$H NMR, $^{13}$C NMR, an FT-IR spectrum, or the like.

General Formula (2)

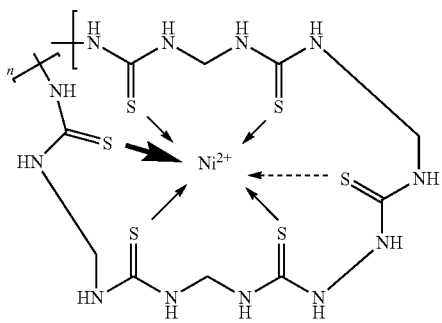

In general formula (2), n represents an integer of 1 or more. Note that the upper limit for n is normally approximately 200.

<<Content of Coordination Compound (Ni-TUF)>>

The content of the coordination compound (Ni-TUF) in the presently disclosed catalyst is preferably 5 mass % or more, more preferably 10 mass % or more, and particularly preferably 13 mass % or more, and is preferably 70 mass % or less, more preferably 50 mass % or less, and particularly preferably 20 mass % or less.

Catalytic activity can be improved through the content of the coordination compound (Ni-TUF) being not less than any of the lower limits set forth above, whereas high catalytic activity can be expressed through the content of the coordination compound (Ni-TUF) being not more than any of the upper limits set forth above.

Note that the content of the coordination compound in the presently disclosed catalyst can be measured using energy dispersive X-ray spectroscopy (EDX), an element mapping image, or the like, for example. Moreover, in a case in which the coordination compound is used in the form of the coordination compound (Ni-TUF) in production of the catalyst, the content thereof can be calculated based on the amount of the coordination compound (Ni-TUF) that is used.

Note that the electronic state of the coordination compound (Ni-TUF) in the presently disclosed catalyst can be measured by X-ray photoelectron spectroscopy (XPS), for example.

<<Production Method of Coordination Compound (Ni-TUF)>>

Examples of methods by which the coordination compound (Ni-TUF) may be produced include: (i) a method X in which the condensate (TUF), nickel(II) nitrate, and 1-butanol are mixed at a specific temperature (preferably 80° C. to 95° C., and more preferably 60° C.), filtered, washed with 1-butanol and methanol, and then dried at a specific temperature (preferably room temperature to 60° C.) to produce the coordination compound (Ni-TUF); and (ii) a method Y in which thiourea is added into formaldehyde aqueous solution, pH adjustment is performed (preferably pH 2.8 to pH 3.2, and more preferably pH 3) with acetic acid, and refluxing is performed at a specific temperature (preferably 80° C. to 95° C., and more preferably 90° C.) for a specific time (preferably 2 hours to 7 hours, and more preferably 6 hours) to yield a white viscous product that is then washed with sodium hydroxide aqueous solution, is further washed with pure water and methanol, and is dried at a specific temperature (preferably 30° C. to 80° C., and more preferably 60° C.) in open air to produce the coordination compound (Ni-TUF). Method Y is preferable in terms of enabling production of a catalyst with which excellent oxygen reduction reaction (ORR) catalytic activity is stably obtained.

<(C) Porous Carbon>

The (C) porous carbon in the presently disclosed catalyst may be present individually as porous carbon or may be present in a state in which it is surrounded by the coordination compound (Ni-TUF).

The state in which the (C) porous carbon is present can be measured through $^1$H NMR, $^{13}$C NMR, an FT-IR spectrum, or the like, for example.

It is essential that the porous carbon is mesoporous but not essential that the porous carbon is microporous. Accordingly, micropores may or may not be present, but it is difficult to obtain porous carbon that is completely free of micropores because, during carbonization of an organic substance that serves as a formation source for the porous carbon, the organic substance normally releases volatile matter and undergoes carbonization, thereby resulting in micropores typically remaining as release marks. In contrast to micropores, mesopores are normally intentionally formed. For example, it is typically the case that a template material of an acid (alkali) soluble metal, metal oxide, metal salt, or metal-containing organic substance and porous carbon (or an organic material serving as a source material thereof) are shaped together and then template material parts are dissolved and removed in an acid (alkali) such that scars where the template material parts have been removed constitute mesopores.

In the present specification, pores having a pore diameter of less than 2 nm are referred to as micropores and pores having a diameter of not less than 2 nm and not more than 150 nm are referred to as mesopores.

It is preferable in terms of stability that the mesopores having the size set forth above form a three-dimensional network structure (interconnected pores).

The BET specific surface area of the porous carbon is preferably 50 m$^2$/g or more, more preferably 500 m$^2$/g or more, and particularly preferably 800 m$^2$/g or more, and is preferably 2,000 m$^2$/g or less, and more preferably 1,800 m$^2$/g or less.

Voids are formed in sufficient quantity through the BET specific surface area being not less than any of the lower limits set forth above, whereas mesopores are sufficiently formed through the BET specific surface area being not more than any of the upper limits set forth above.

The BET specific surface area can, for example, be determined by the BET (Brunauer-Emmett-Teller) method from measurement results of an adsorption isotherm obtained using a Surface Area and Porosimetry Analyzer (TriStar II 3020 produced by Shimadzu Corporation).

The total pore volume of the porous carbon is preferably 0.2 mL/g or more, and is preferably 2.3 mL/g or less, and more preferably 1.8 mL/g or less.

It is rare for mesopores to be present as independent pores when the total pore volume is not less than the lower limit set forth above, whereas a nanostructure can be constructed without the carbon structure becoming bulky when the total pore volume is not more than any of the upper limits set forth above.

The total pore volume can, for example, be determined by the BJH (Barrett-Joyner-Hallender) method from measurement results of an adsorption isotherm obtained using a Surface Area and Porosimetry Analyzer (TriStar II 3020 produced by Shimadzu Corporation).

The micropore volume of the porous carbon is preferably 1 mL/g or more, and more preferably 1.5 mL/g or more, and is preferably 3 mL/g or less, and more preferably 2 mL/g or less.

Better catalyst loading efficiency is obtained through the micropore volume being not less than any of the lower limits set forth above.

The tap density of the porous carbon is preferably 0.05 g/mL or more, and more preferably 0.1 g/mL or more, and is preferably 0.3 g/mL or less, and more preferably 0.2 g/mL or less.

Better catalyst loading efficiency is obtained through the tap density being not less than any of the lower limits set forth above.

The tap density can be determined using a nanopore analyzer or the like, for example.

The mesopore content of the porous carbon is preferably 25.0% or more, and more preferably 30.0% or more, and is preferably 80.0% or less, and more preferably 60.0% or less.

Sufficient three-dimensional networkization of pores in the porous carbon occurs and better catalyst loading efficiency can be obtained through the mesopore content being not less than any of the lower limits set forth above, whereas pores can be sufficiently formed inside of the porous carbon and the porous carbon can serve as a support of a high-performance catalyst through the mesopore content being not more than any of the upper limits set forth above.

The mesopore content can, for example, be derived using the following equation (1) from measurement results of an adsorption isotherm obtained using a Surface Area and Porosimetry Analyzer (TriStar II 3020 produced by Shimadzu Corporation).

Equation (1)

$$\text{Mesopore content (\%)} = \frac{\left(\text{Amount of adsorption at } p/p_0 = 0.96\right) - \left(\text{Amount of adsorption at } p/p_0 = 0.3\right)}{\left(\text{Amount of adsorption at } p/p_0 = 0.96\right)} \times 100$$

Note that in equation (1), the value for $p/p_0=0.3$ represents the amount of adsorption attributed to micropores of the porous carbon, whereas the value for $p/p_0=0.96$ represents the amount of adsorption attributed to mesopores of the porous carbon.

Porous carbon that is produced as appropriate or a commercially available product may be used as the porous carbon. Examples of commercially available products that may be used include CNovel® (CNovel is a registered trademark in Japan, other countries, or both; produced by Toyo Tanso Co., Ltd.).

The method by which the porous carbon is produced can be selected as appropriate depending on the object without any specific limitations. For example, a method in which a template material having a three-dimensional network structure (interconnected pores) and an organic substance serving as a porous carbon formation source are shaped and carbonized, and then the template material is dissolved in an acid or alkali may be adopted. In such a situation, marks where the template material has dissolved constitute a plurality of mesopores that form a three-dimensional network structure (interconnected pores), and thus mesopores can be intentionally formed.

The template material can be selected as appropriate depending on the object without any specific limitations and may, for example, be a metal, a metal oxide, a metal salt, a metal-containing organic substance, or the like. Of these examples, those that are acid or alkali soluble are preferable.

The organic substance can be selected as appropriate depending on the object without any specific limitations so long as it can be carbonized. Note that since the organic substance releases volatile matter during carbonization, it is difficult to produce porous carbon that is completely free of micropores because micropores are formed as release marks.

<<(C) Content of Porous Carbon>>

The content of the (C) porous carbon in the presently disclosed catalyst is preferably 40 mass % or more, more preferably 50 mass % or more, and particularly preferably 60 mass % or more, and is preferably 90 mass % or less, more preferably 87 mass % or less, and particularly preferably 84 mass % or less.

Efficient catalyst loading is possible through the content of the (C) porous carbon being not less than any of the lower limits set forth above, whereas a catalyst having high activity can be synthesized through the content of the (C) porous carbon being not more than any of the upper limits set forth above.

Note that the content of the (C) porous carbon in the presently disclosed catalyst can be measured using energy dispersive X-ray spectroscopy (EDX), an element mapping image, or the like, for example. Moreover, the content of the (C) porous carbon can be calculated based on the amount of the (C) porous carbon that is used in production of the catalyst.

<Production Method of Catalyst>

The presently disclosed catalyst may be obtained by, for example, performing first ultrasonication of the coordination compound (Ni-TUF) in a dispersion medium, subsequently adding the (C) porous carbon, performing second ultrasonication, performing drying in open air, and so forth.

<<Ratio (Mass Ratio) of Addition Amounts of Coordination Compound (Ni-TUF) (A+B) and Porous Carbon (C)>>

A ratio of the addition amounts of the coordination compound (Ni-TUF) (A+B) and the porous carbon (C) (coordination compound (Ni-TUF) (A+B)/porous carbon (C)) is preferably 2/50 or more, more preferably 4/50 or more, even more preferably 5/50 or more, further preferably 6/50 or more, and particularly preferably 10/50 or more, and is preferably 60/50 or less, more preferably 50/50 or less, even more preferably 35/50 or less, further preferably 30/50 or less, and particularly preferably 20/50 or less.

Catalytic activity can be improved through the addition amount being not less than any of the lower limits set forth above and can also be improved through the content being not more than any of the upper limits set forth above.

<<Dispersion Medium>>

The dispersion medium may be dimethylacetamide (DMAc) or the like.

<<First Ultrasonication>>

The treatment time in the first ultrasonication is not specifically limited but is preferably not less than 10 minutes and not more than 2 hours (for example, 30 minutes).

<<Second Ultrasonication>>

The treatment time in the second ultrasonication is not specifically limited but is preferably not less than 20 minutes and not more than 12 hours (for example, 2 hours).

(Electrode)

The presently disclosed electrode is an electrode that contains the presently disclosed catalyst. The presently disclosed electrode has excellent activity as an electrode.

The presently disclosed electrode can be formed by, for example, applying a dispersion liquid of the catalyst onto a substrate such as polyimide or poly(tetrafluoroethylene), drying the dispersion liquid to form a catalyst layer, and subsequently performing transfer thereof onto a conductive porous substrate such as carbon cloth or carbon paper by hot pressing. Alternatively, the electrode can be formed by applying the dispersion liquid of the catalyst onto the conductive porous substrate by die coating, spraying, or the like, and then drying the dispersion liquid. A solvent that is used in the dispersion liquid of the catalyst may be the dispersion medium that was described in relation to the production method of the catalyst. Although no specific limitations are placed on the content of the catalyst in the dispersion liquid, a content of 0.001 mass % to 10 mass % is appropriate.

The thickness of the catalyst layer in the presently disclosed electrode is not specifically limited but is approximately 0.005 μm to 100 μm. An appropriate amount of the catalyst in this catalyst layer is 0.1 mg/m$^2$ to 2×10$^4$ mg/m$^2$.

The presently disclosed electrode may suitably be used for electrolysis of water, for electrolysis of an organic substance, in a chargeable/dischargeable air battery, in a fuel cell (particularly as an electrode (air electrode, fuel electrode) of a polymer electrolyte fuel cell), or the like, for example.

(Membrane Electrode Assembly)

The presently disclosed membrane electrode assembly (MEA) is a membrane electrode assembly that includes the presently disclosed electrode. The membrane electrode assembly can be obtained through pressure bonding of the electrode to an ion exchange membrane. The "ion exchange membrane" is a product obtained by shaping an ion exchange resin into the form of a membrane and may, for example, be a proton conducting membrane, an anion exchange membrane, or the like.

The presently disclosed membrane electrode assembly may suitably be used in a chargeable/dischargeable air battery, a fuel cell (particularly a polymer electrolyte fuel cell), or the like.

(Air Battery)

The presently disclosed air battery is an air battery that includes the presently disclosed electrode or the presently disclosed membrane electrode assembly. Note that the term "air battery" refers to a battery in which oxygen in air is used as a positive electrode active material and in which a metal (zinc or lithium) is used as a negative electrode active material (i.e., a zinc-air battery or a lithium-air battery). In the air battery, a porous carbon material, a porous metal material, or a composite material of both thereof displaying catalytic action is typically used as an air electrode (positive electrode) in order that oxygen in air can be taken into the battery, any of various metals is typically used as a negative electrode, and an aqueous solution such as potassium hydroxide aqueous solution is typically used as an electrolyte solution. During discharging of the air battery, oxygen ($O_2$) in air is caused to dissolve in the electrolyte solution as $OH^-$ through the catalytic action of the air electrode (positive electrode), and reacts with a negative electrode active material to generate electromotive force. Conversely, the reverse reaction occurs during charging of the air battery. The presently disclosed electrode and membrane electrode assembly can be used as the positive electrode of the air battery. The presently disclosed air battery is useful as an automobile power supply, a household power supply, or a small power supply for a mobile device such as a mobile telephone or a portable computer, for example.

EXAMPLES

The following provides a more detailed description of the present disclosure through examples. However, the present disclosure is not in any way limited by the following examples.

(1) Evaluation of Oxygen Reduction Reaction (ORR) Catalytic Activity

Oxygen reduction reaction (ORR) catalytic activity was evaluated by performing linear sweep voltammetry (LSV) as described below and then calculating the onset potential and half-wave potential ($E_{1/2}$) of the oxygen reduction reaction (ORR). The results are shown in Table 1.

Specifically, a working electrode was immersed in 0.1 M (or 1 M) KOH electrolyte, a potential scan was made from high potential of 1.2 V (vs. RHE) toward low potential, and the current density was measured from reaction current that flowed in response thereto. The onset potential and half-wave potential ($E_{1/2}$) of the oxygen reduction reaction (ORR) were then calculated based on the measured current density.

Apparatus: Rotating ring disk electrode apparatus (produced by BAS Inc.; product name: RRDE-3A)

Electrolyte: 0.1 M or 1 M KOH

Working electrode: Electrode having 0.25 mg/cm$^2$ of catalyst produced in each example or comparative example loaded onto glassy carbon Reference electrode: Ag/AgCl electrode or Hg/HgO electrode Counter electrode: Platinum coil Note that values for the onset potential and half-wave potential ($E_{1/2}$) of the oxygen reduction reaction (ORR) that are shown in Table 1 are potentials (units: V) measured with a reversible hydrogen electrode (hydrogen electrode for which an electrolyte solution having the same pH as the pH of a solution in which the electrode that is a measurement subject is immersed is used) as a standard (vs. RHE), and larger values for both the onset potential and the half-wave potential ($E_{1/2}$) are more preferable.

(2) Evaluation of Catalyst Durability

Catalyst durability was evaluated by performing a chronopotentiometry test as described below with respect to catalysts produced in Examples 1 to 4. The results demonstrated that performance does not significantly change over 100 hours and that the catalysts produced in Examples 2 to 4 have good durability.

Specifically, a working electrode was immersed in 0.1 M (or 1 M) KOH electrolyte, was held at 0.88 V (vs. RHE), and the time dependence of potential was measured.

Apparatus: Rotating ring disk electrode apparatus (produced by BAS Inc.; product name: RRDE-3A)

Electrolyte: 0.1 M or 1 M KOH

Working electrode: Electrode having 0.25 mg/cm$^2$ of catalyst produced in each of Examples 1 to 4 loaded onto glassy carbon Reference electrode: Ag/AgCl electrode or Hg/HgO electrode Counter electrode: Platinum coil (3) Characteristic Evaluation of Zinc-Air Battery A dispersion liquid for a positive electrode was produced by adding 5 mg of a catalyst B (Ni-TUF/CN-10 mg) produced in Example 2, described further below, 20 μL of a 20 weight % Nafion dispersion liquid (produced by Sigma-Aldrich), which is a perfluorocarbon material, 160 μL of isopropyl alcohol, and 40 μL of distilled water, and treating these materials for 1 hour in a bath-type ultrasonic disperser. The obtained positive electrode dispersion liquid was applied onto a gas diffusion layer (Sigracet GDL22BB produced by SGL Carbon Japan Co., Ltd.) using a brush such as to have a deposition amount after drying of 0.5 mg/cm$^2$, and was then dried to obtain a positive electrode member for a zinc-air battery. The produced positive electrode member and zinc foil of 0.1 mm in thickness serving as a negative electrode were each cut out as a circle of 17 mm in diameter. A separator and the negative electrode were stacked in order on the coated surface of the positive electrode member, and were then housed inside a coin-type outer container made of stainless steel. KOH aqueous solution of 6 mol/L in concentration was injected into the container such that no air remained, a stainless steel cap having a mesh structure was placed over the container and was fixed in place, and the battery can was sealed to thereby produce a zinc-air battery having a diameter of 20 mm and a thickness of 3.2 mm (coin cell CR2032).

Next, a charge/discharge characteristic of the zinc-air battery was measured. FIG. 1 illustrates the charge/discharge characteristic for the zinc-air battery that was produced with the catalyst B as a positive electrode catalyst. The discharge potential and the charge potential of this zinc-air battery were 1.35 V and 1.80 V, respectively, and the overpotential of the zinc-air battery was smaller than that of a conventional zinc-air battery, which indicates that this zinc-air battery has high performance. Although FIG. 1 only illustrates the charge/discharge characteristic up to 200 minutes, the trend of the charge/discharge characteristic did not change even after 1,200 minutes or more, demonstrating that the zinc-air battery has high charge/discharge cycling durability.

(Preparation of Porous Carbon)

CNovel® (produced by Toyo Tanso Co., Ltd.; grade: MH) was prepared as porous carbon.

Note that physical properties of the CNovel® (produced by Toyo Tanso Co., Ltd.; grade: MH) were as follows.

BET specific surface area: 1,500 m$^2$/g
Total pore volume: 1.7 mL/g
Micropore volume: 0.5 mL/g
Tap density: 0.15 g/mL <Production of Coordination Compound (Ni-TUF)>

Thiourea (0.2 mol) was added into 37 mass % formaldehyde (0.2 mol) aqueous solution, adjustment to pH 3 was performed with acetic acid, and 1 mol of nickel(II) nitrate was subsequently added and was refluxed therewith at 90° C. for 6 hours to yield a viscous product that was washed with 1 M sodium hydroxide aqueous solution, further washed with pure water and methanol, and then dried at 60° C. in open air (method Y) to produce a coordination compound (Ni-TUF). The condensate (TUF) in the coordination compound (Ni-TUF) had a weight-average molecular weight of 10,000 and a molecular weight distribution of 2.0.

Example 1

A catalyst A (Ni-TUF/CN-5 mg) was produced as described below, and then (1) evaluation of oxygen reduction reaction (ORR) catalytic activity and (2) evaluation of catalyst durability were performed with respect to the produced catalyst A.

<Production of Catalyst A (Ni-TUF/CN-5 mg)>

After subjecting 5 mg of the produced coordination compound (Ni-TUF) to 30 minutes of ultrasonication in 40 mL of dimethylacetamide (DMAc) using an ultrasonic disperser (produced by Branson; product name: Ultrasonic Cleaner 5580), 50 mg of CNovel® (produced by Toyo Tanso Co., Ltd.; grade: MH) was added thereto, a further 2 hours of ultrasonication was performed using the ultrasonic disperser (produced by Branson; product name: Ultrasonic Cleaner 5580), and then drying was performed in open air to produce the catalyst A (Ni-TUF/CN-5 mg). In the catalyst A, the Ni atom content was 1.2 mass %, the condensate (TUF) content was 9.1 mass %, and the porous carbon (CNovel®) content was 89.7 mass %.

Example 2

With the exception that 10 mg of the produced coordination compound (Ni-TUF) was used so as to produce a catalyst B (Ni-TUF/CN-10 mg) instead of using 5 mg of the produced coordination compound (Ni-TUF) so as to produce the catalyst A (Ni-TUF/CN-5 mg) in Example 1, catalyst production, (1) evaluation of oxygen reduction reaction (ORR) catalytic activity, and (2) evaluation of catalyst durability were performed in the same way as in Example 1. The results are shown in Table 1. In the catalyst B, the Ni atom content was 2.2 mass %, the condensate (TUF) content was 16.7 mass %, and the porous carbon (CNovel®) content was 81.1 mass %.

Example 3

With the exception that 30 mg of the produced coordination compound (Ni-TUF) was used so as to produce a catalyst C (Ni-TUF/CN-30 mg) instead of using 5 mg of the produced coordination compound (Ni-TUF) so as to produce the catalyst A (Ni-TUF/CN-5 mg) in Example 1, catalyst production, (1) evaluation of oxygen reduction reaction (ORR) catalytic activity, and (2) evaluation of catalyst durability were performed in the same way as in Example 1. The results are shown in Table 1. In the catalyst C, the Ni atom content was 4.9 mass %, the condensate (TUF) content was 37.5 mass %, and the porous carbon (CNovel®) content was 57.6 mass %.

Example 4

With the exception that 50 mg of the produced coordination compound (Ni-TUF) was used so as to produce a catalyst D (Ni-TUF/CN-50 mg) instead of using 5 mg of the produced coordination compound (Ni-TUF) so as to produce the catalyst A (Ni-TUF/CN-5 mg) in Example 1, catalyst production, (1) evaluation of oxygen reduction reaction (ORR) catalytic activity, and (2) evaluation of catalyst durability were performed in the same way as in Example 1. The results are shown in Table 1. In the catalyst D, the Ni atom content was 5.2 mass %, the condensate (TUF) content was 50.0 mass %, and the porous carbon (CNovel®) content was 44.8 mass %.

Comparative Example 1

With the exception that a catalyst E (Pt/C) produced as described below was used instead of the catalyst A (Ni-TUF/CN-5 mg) as a catalyst in Example 1, (1) evaluation of oxygen reduction reaction (ORR) catalytic activity was performed in the same way as in Example 1. The results are shown in Table 1.

<Production of Catalyst E (Pt/C)>

The catalyst E (Pt/C) was produced by a similar technique to the catalyst A.

Comparative Example 2

With the exception that 10 mg of carbon black (produced by Cabot Corporation; product name: VULCAN® XC72 (VULCAN is a registered trademark in Japan, other countries, or both)) was used so as to produce a catalyst F (Ni-TUF/CB-10 mg) instead of using 50 mg of CNovel® (produced by Toyo Tanso Co., Ltd.; grade: MH) so as to produce the catalyst A (Ni-TUF/CN-5 mg) in Example 1, catalyst production and (1) evaluation of oxygen reduction reaction (ORR) catalytic activity were performed in the same way as in Example 1. The results are shown in Table 1.

TABLE 1

| | Catalyst | | | Evaluation | | |
|---|---|---|---|---|---|---|
| | | | | Catalytic activity | | |
| | Catalyst name | Used catalyst sample | Ni-TUF (A + B)/ CNovel (C) (mass ratio) | Onset potential of oxygen reduction reaction (ORR) (vs. RHE) (units: V) | Half-wave potential ($E_{1/2}$) of oxygen reduction reaction (ORR) (vs. RHE) (units: V) | Durability |
| Example 1 | Catalyst A | Ni-TUF/CN-5 | 5/50 | 0.91 | 0.88 | Poor |
| Example 2 | Catalyst B | Ni-TUF/CN-10 | 10/50 | 0.95 | 0.82 | Good |
| Example 3 | Catalyst C | Ni-TUF/CN-30 | 30/50 | 0.92 | 0.78 | Good |
| Example 4 | Catalyst D | Ni-TUF/CN-50 | 50/50 | 0.88 | 0.77 | Good |
| Comparative Example 1 | Catalyst E | Pt/C | — | 0.97 | 0.85 | — |
| Comparative Example 2 | Catalyst F | Ni-TUF/CB-10 | — | — | 0.73 | — |

It can be seen from the results shown in Table 1 that the catalysts of Examples 1 to 4, which each include (A) Ni atoms, (B) a condensate of thiourea and formaldehyde, and (C) porous carbon have oxygen reduction reaction (ORR) catalytic activity that is at least equivalent to that of the catalyst E (Pt/C).

It can also be seen from the results of evaluation of catalyst durability that the catalysts produced in Examples 2 to 4 have good durability.

INDUSTRIAL APPLICABILITY

According to the present disclosure, it is possible to provide a low-cost catalyst that has excellent oxygen reduction reaction (ORR) catalytic activity and is useful as a catalyst for water electrolysis, an electrode catalyst for an air battery, or the like. Moreover, according to the present disclosure, it is possible to provide an electrode that contains the aforementioned catalyst, a membrane electrode assembly that includes the aforementioned electrode, and a chargeable/dischargeable air battery that includes the aforementioned electrode or the aforementioned membrane electrode assembly.

The presently disclosed catalyst is suitable for use in a zinc-air battery, for water decomposition, in a fuel cell, or the like.

The invention claimed is:

1. A catalyst comprising:
   (A) Ni atoms;
   (B) a condensate formed between thiourea and formaldehyde; and
   (C) porous carbon,
   wherein the (B) condensate includes a structure represented by the following general formula (1) in at least part thereof:

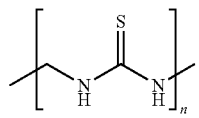

General Formula (1)

where n represents an integer of 10 or more.

2. An electrode comprising the catalyst according to claim 1.

3. A membrane electrode assembly comprising the electrode according to claim 2.

4. An air battery comprising the electrode according to claim 2.

5. An air battery comprising the membrane electrode assembly according to claim 3.

* * * * *